March 20, 1934.  E. W. LITTLE  1,951,550
PERCH FOR BIRD CAGES
Filed Aug. 10, 1929
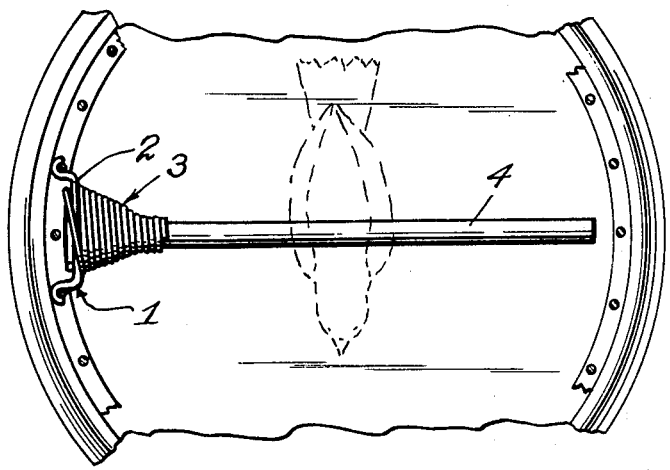
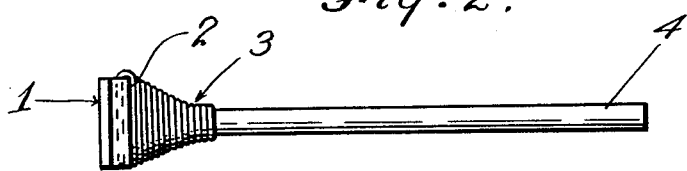
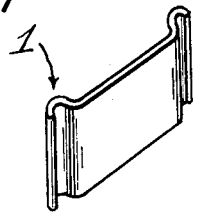 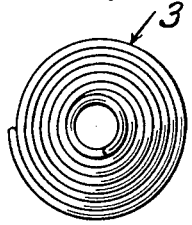 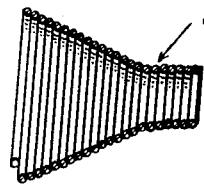
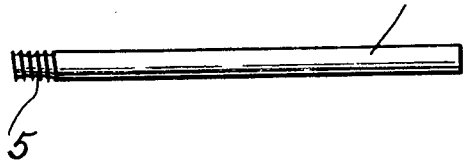
Inventor
Earl W. Little
By L. B. James
Attorney Patented Mar. 20, 1934

1,951,550

UNITED STATES PATENT OFFICE 1,951,550

PERCH FOR BIRD CAGES

Earl W. Little, Indianapolis, Ind.

Application August 10, 1929, Serial No. 384,855

14 Claims. (Cl. 119—26)

This invention relates to a perch for a bird cage, the general object of the invention being to provide a plate which is suitably connected with a part of the cage and a coil spring carried by the plate and so formed that the wooden bar, forming the perch, can be screwed into the same, whereby the perch is resiliently supported and will simulate the bough of a tree, thus giving the bird more exercise which promotes the health of the bird. As the parts are easily separated, they can be readily taken apart and cleaned and replaced and the device can be manufactured to sell at low cost.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1 is a sectional view through a cage, showing the improved perch therein.

Figure 2 is a side view of the perch connected with the plate.

Figure 3 is a view of the plate.

Figures 4 and 5 are views of the spring.

Figure 6 is a view of the rod.

In the drawing, the numeral 1 indicates a metal plate which is suitably attached to a part of the cage, preferably by forming hooks on the plate so that it is detachably connected with the cage. This plate is formed with an offset central portion 2 so that a convolution of the coil spring 3 can be slipped over the plate to removably connect the spring with the plate. This spring is preferably formed with a conical main part and a cylindrical outer part, as shown in the drawing. The wooden rod 4 is adapted to have one end screwed into the cylindrical part of the spring so that the rod is resiliently supported. After the rod is first screwed into the spring, the convolutions of the spring will form spiral grooves 5 therein so that the rod can be easily screwed into the spring after the first time the rod is screwed into the spring.

Thus it will be seen that the perch will simulate the natural resiliency of the bough of a tree so that a bird using the perch will secure more exercise than it can on an ordinary perch so that the health of the bird is promoted and due to the simple construction and arrangement of the parts, they can be easily separated and cleaned and the device can be manufactured to sell at low cost, due to the absence of screws, bolts and the like.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A perch of the class described comprising a supporting plate having an offset central portion and hooked shaped ends opening on the offset side thereof, a coil spring having one of its convolutions slipped over the offset portion and a wooden rod having one end threaded into the spring whereby some of the convolutions of the spring will form spiral grooves in the end of the rod so that the rod can be detached from the spring and replaced therein.

2. In a perch for cages, a spring having one of its ends volute and its opposite end spiral, said volute and spiral portions being direct continuations of each other and in axial alignment with each other, a perch rod removably secured in the spiral portion of the spring, and means on the volute portion for attaching the spring to parts of a cage.

3. Means for yieldingly suspending a perch in a cage, comprising a spring having a volute portion adapted to be secured to parts of a cage, and a spirally arranged portion threadedly engaging one end of a perch, said volute and spiral portions being axially aligned.

4. Means for suspending a perch in a cage comprising a volute spring terminating in an extended spiral perch receiving portion, said volute and spiral portions being axially aligned and forming a continuation of one another.

5. Means for suspending a perch in a cage, comprising a spring having a volute portion and a spiral portion, a portion of said volute end being arranged for engagement with parts of a cage for suspending the spring with the spiral portion inwardly, and a perch axially suspended from the spiral portion of the spring, the coils of said spiral portion being of a diameter to cause the coils to bite into the surface of the perch for positively holding the perch in engagement with the spring and in a teetering position.

6. Means for suspending a perch, comprising a member having a volute portion, and a spiral portion, one being a direct continuation of the other and in axial alignment with each other, means on the volute portion for suspending the member, the diameter of the spiral portion being less than the diameter of the perch whereby said spiral portion will grip the end of the perch entered therein and anchor the perch in said spiral portion.

7. Means for resiliently suspending a perch in a cage comprising a spring having a volute portion and a spiral portion, and a plate removably inserted between two of the coils of the volute portion for suspending the spring and perch carried thereby.

8. Means for resiliently suspending a perch in a cage, comprising a spring having a volute portion at one end and a spiral portion at the opposite end thereof, a perch seated at one end in said spiral portion, and a stationary plate partially engaged between two of the coils of the volute portion for suspending the spring and perch from the plate.

9. Means for resiliently suspending a perch in a cage, comprising a spring having a volute portion at one end and a spiral portion at the opposite end thereof, a perch secured at one end in said spiral portion, and a stationary plate engaged between certain of the coils of the volute portion for suspending the spring and perch from the plate, said coils directing pressure against both faces of said plate.

10. Means for resiliently suspending a perch in a cage, comprising a spring having a volute portion at one end and a spiral portion at the opposite end thereof, a perch threadedly entered at one end in said spiral portion, and a stationary plate seated between certain of the coils of the volute portion for suspending the spring and perch from the plate, said coils forming the sole connection with said plate.

11. Means for resiliently suspending a perch in a cage comprising a spring having a volute portion and a spiral portion, and a plate frictionally retained between two of the coils of the volute portion for suspending the spring and perch carried thereby, the position of the plate with respect to the coils of the volute portion determining the resiliency or flexibility of said spiral portion.

12. In combination with adjacent wires of a bird cage, a bird perch comprising a close wire coil having a portion enlarged to engage a support on said wires, and a perch bar mounted in the coil on the axis thereof.

13. In a bird perch, a support comprising a closely wound conical spring, and a bar mounted in and projecting axially from the smaller end of the spring, the larger end of the coil being loosely wound and adapted to receive a coil supporting means.

14. The combination with a supporting bar or strap; of a spring member having a helical portion and a conoidal portion, a perch adapted to be engaged with the helical end portion and means for adjustably attaching said conoidal portion of the spring member to said bar for regulating the resilient movement of said perch.

EARL W. LITTLE.